Figure 1:
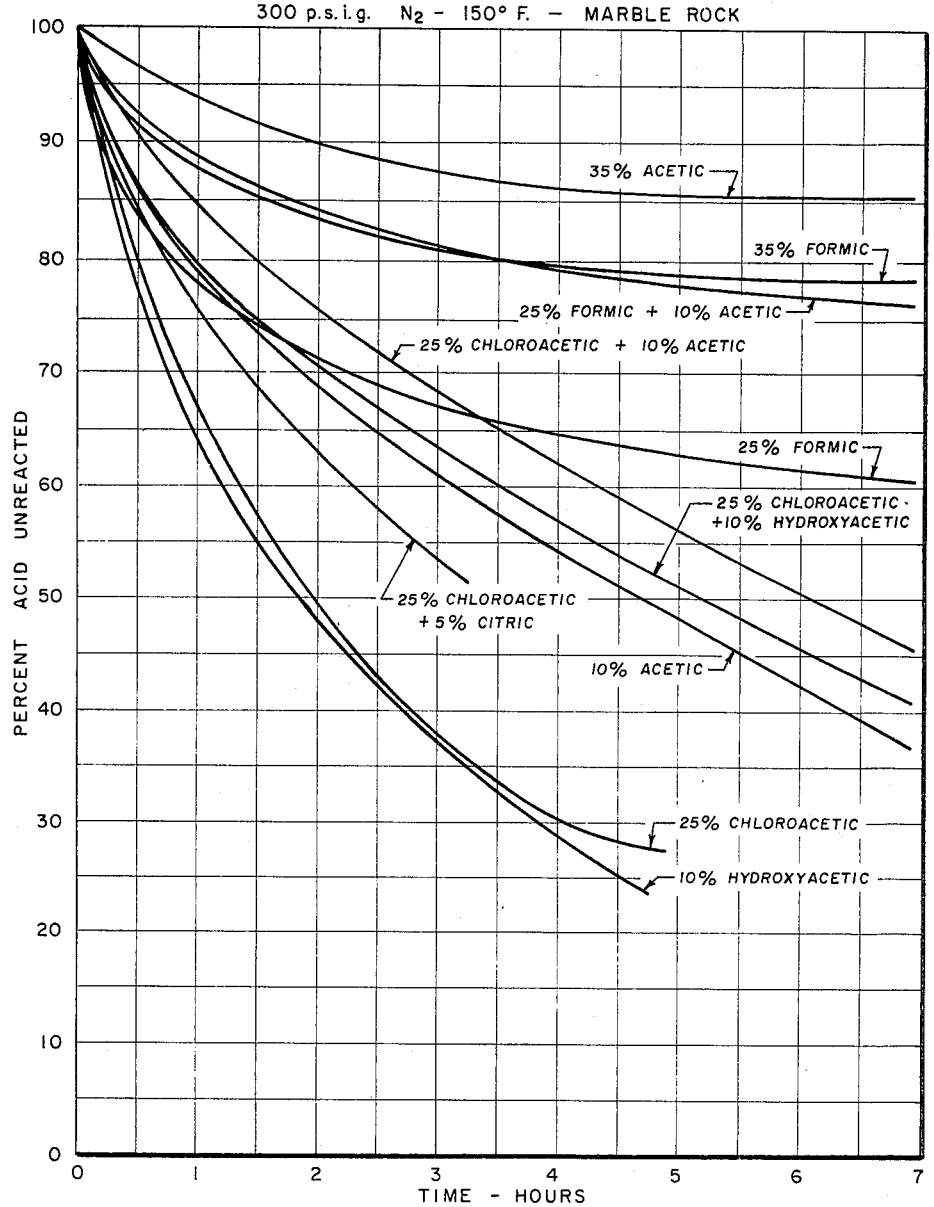

Caurino C. Bombardieri
Thomas H. Martin
INVENTORS.

United States Patent Office 3,251,415
Patented May 17, 1966

3,251,415
ACID TREATING PROCESS
Caurino C. Bombardieri and Thomas H. Martin, Calgary, Alberta, Canada, assignors to Esso Production Research Company, a corporation of Delaware
Filed Apr. 1, 1965, Ser. No. 444,537
14 Claims. (Cl. 166—42)

This application is a continuation-in-part of application Serial No. 137,635, filed in the United States Patent Office on September 12, 1961, and now abandoned.

The present invention relates to the treatment of subterranean formations and is particularly concerned with an improved acid treating process for increasing the permeability of formations surrounding oil wells, gas wells and similar boreholes.

Acid treating is widely used to improve the permeability of carbonates and other formations surrounding wells and similar boreholes. Processes which have been used or proposed for use are described in U.S. Patent 1,877,504 to Grebe et al., U.S. 2,140,183 to Bresler, U.S. 2,175,079 to Dow U.S. 2,175,095 to Stoesser, U.S. 2,217,676 to Fry, U.S. 2,301,875 to Holmes, U.S. 2,358,562 to Dismukes, U.S. 2,640,810 to Cardwell et al., U. S. 2,681,889 to Menaul et al., U.S. 2,713,033 to Cardwell et al., U.S. 2,824,833 to Cardwell et al., U.S. 2,894,907 to Newcombe et al., U.S. 2,957,823 to Newcombe et al., U.S. 3,044,549 to Jones and U.S. 3,076,762 to Dill. As pointed out in these references, not all carbonate formations respond favorably to treatment with hydrochloric acid. In reservoirs of low permeability, the injectivity or productivity of a well may remain unchanged or may actually decline following such treatment. This may be attributed in part to the high reaction rate of hydrochloric acid with calcium carbonate and similar formations. The rate at which the acid is neutralized as it comes in contact with the exposed surfaces of the formation may exceed the rate at which it can be forced into the reservoir and hence the acid which contacts the rock at points more than a few inches from the well bore may be essentially spent. In such cases, the effect of the acid is limited for the most part to enlargement of the well bore within the treated zone and little or no improvement in permeability takes place.

There have been numerous suggestions in the past as to methods which might be used to increase the effectiveness of acid treating operations carried out in carbonate reservoirs of low permeability. The injection of the acid solution in the form of an emulsion in oil in order to delay contact between the acid and rock has been proposed. The addition of materials intended to minimize effects of the acid on clay particles and hence increase penetration of the solution has been advocated. It has been suggested that weak organic acids which have low dissociation constants be substituted for the hydrochloric acid normally used. The addition of buffering agents to the acid solution to control the hydrogen ion concentration and thus delay the reaction of the acid has been recommended. It has been proposed that the acid solution be chilled to delay the reaction. Although some of these methods have shown promise of delaying reaction of the acid under certain circumstances, their use has not produced a marked reduction in the number of unsuccessful acid treating operations.

Figure 2:
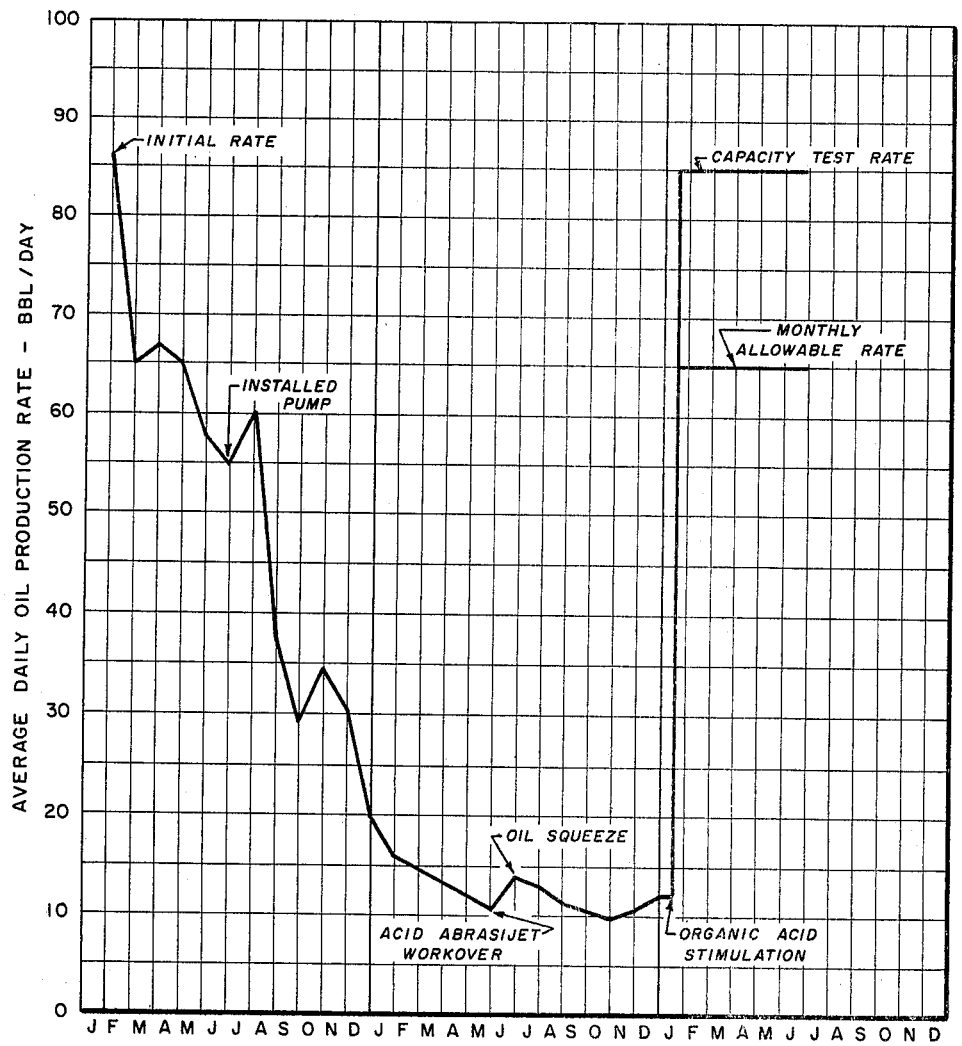

It is therefore an object of the present invention to provide an improved acid treating process which will increase the permeability of subterranean reservoirs at greater distances from the injection wells than has generally been feasible with processes available heretofore. Other objects will become apparent from the ensuing description of the invention and the accompanying drawing, in which:

FIGURE 1 illustrates the results of laboratory tests of various acid solutions; and
FIGURE 2 depicts the results obtained in a field application of the invention.

In accordance with the invention, it has now been found that mixtures of low molecular weight carboxylic acids are considerably more effective in acid treating operations than are solutions of the individual acids in the same concentrations and that such mixtures will often increase the injectivity or productivity of subterranean formations which do not respond to treatment with conventional acid solutions. The low molecular weight organic acids suitable for purposes of the invention are aliphatic carboxylic acids containing from one to six carbon atoms per molecule. Examples include formic acid, acetic acid, hydroxyacetic acid, chloroacetic acid, succinic acid, propionic acid, butyric acid, lactic acid, oxalic acid, maleic acid, dichloroactic acid, citric acid, chloropropionic acid and the like. The saturated fatty acids and substituted fatty acids containing from one to three carbon atoms per molecule, particularly formic, acetic, propionic, chloroacetic and hydroxyacetic acids, are preferred.

The acid mixtures employed in accordance with the invention are normally solutions containing two or more of the low molecular weight organic acids in a total acid concentration between about 10% and about 50% by weight. The individual acids will generally be present in concentrations between about 5% and about 35% by weight. Typical mixtures which may be employed include (a) 25% formic acid, 10% acetic acid; (b) 25% formic acid, 10% propionic acid; (c) 25% formic acid, 10% butyric acid; (d) 25% formic acid, 5% acetic acid, 5% propionic acid; (e) 25% chloroacetic acid, 10% acetic acid; (f) 25% chloroacetic acid, 10% hydroxyacetic acid; (g) 25% chloroactic acid, 5% citric acid; (h) 15% dichloroactic acid, 15% oxalic acid; (i) 20% acetic acid, 15% butyric acid; (j) 25% maleic acid, 5% citric acid; (k) 20% oxalic acid, 10% citric acid; (l) 30% acetic acid, 5% formic acid, 5% succinic acid; (m) 15% chloropropionic acid, 10% chloroactice acid, 10% hydroxyacetic acid; (n) 30% formic acid, 20% oxalic acid; (o) acetic acid, 5% lactic acid; (p) 10% citric acid, 15% acetic acid, 15% formic acid; and the like. Mixtures containing from about 5% to about 35% formic acid from about 1% to about 20% of a second low molecular weight carboxylic acid have been found to be particularly effective for purposes of the invention and are therefore preferred. Mixtures containing from 20 to 30% by weight of formic and from 5 to 15% by weight of an acid containing from two to three carbon atoms per molecule are especially effective.

The solutions employed in carrying out the invention may contain, in addition to the mixed acids, from about 0.05% by weight to about 3.5% by weight or more of a corrosion inhibitor in order to reduce damage to storage vessels, pumps, tubing and other equipment with which the solutions may come into contact. A variety of inhibitors soluble in the acid solution can be utilized for this purpose. Suitable inhibitors include arsenic trioxide, alkali metal arsenates and arsenites, aniline, phenyl hydrazine, pyridine, quinoline, mercaptans, sodium mercaptobenzothiazol, triethanolamine phosphate and the like. It will be recognized that the efficiency of these and other inhibitors varies, depending upon the particular acids present and the conditions under which they are employed, and that some materials may therefore have to be utilized in higher concentrations than others.

In addition to the corrosion inhibitors, the acid solutions may also contain demulsifiers and other surface active agents in concentrations ranging between about 0.01% and about 3.0% by weight. Experience has shown that the use of a surface active agent or demulsifier in conjunction with the mixed acids materially increases the acid half-life and thus promotes greater penetration of the unspent acid solutions. The surface active agents and demulsifiers employed may be anionic, cationic or nonionic. Suitable materials include polyoxyethylated nonylphenol, sodium N-methyl-N-oleyl taurate, alkylphenol ethylene oxide condensates, octyl polyoxyethanols, alkylphenyl polyethylene glycol ethers, aliphatic polyoxyethylene ether alcohols, alkyl aryl sulfonates and organic salts of such sulfonates, polyethylene glycol esters of oleic acid, sodium toluene sulfonate, condensation products of ethylene oxide and alkyl phenols, and the like. It is generally preferred to utilize such materials in concentrations between about 0.1% and about 0.5% by weight. A number of commercial surface active agents and demulsifiers suitable for use in oil field treating operations have been described in detail in the technical literature and will be familiar to those skilled in the art.

In most acid treating operations carried out with the mixed acid solutions, it is preferred that the viscosity of the solution be kept at a minimum in order to facilitate penetration of the acid into the pores of the treated formation. In certain applications, however, fracturing of the reservoir may be desired and hence a thickening agent which will temporarily increase the viscosity of the solution and reduce its penetration prior to fracturing may be incorporated into the solution. Once the desired fractures have been formed and the thickening agent has lost its effectiveness in the acid solution, the mixed acid will flow into the fractures and attack the formation. Thickening agents which may be employed for this purpose include water soluble gums and resins such as guar gum, gum karaya, gum tragacanth, gum gatti, gum kauri, and the like; high molecular weight water soluble polymers produced by the copolymerization of vinyl aromatic compounds, acrylic acids, unsaturated esters, olefins and similar organic monomers; and certain polysaccharides produced by the bacterial fermentation of sugar, starch and other carbohydrates. Water soluble thickening agents which gradually lose their viscosity-increasing properties in the presence of acids and salts have been suggested in the prior art. Such thickeners are normally employed in concentrations between about 0.005% and about 2.0% by weight. The exact concentration utilized will depend upon the viscosity desired and the particular thickening agent selected.

In carrying out the process of the invention, the well to be treated is normally first killed by injecting sufficient crude oil into the well bore to prevent further influx of fluids from the formation. In the case of water injection or nonproducing wells, this initial step may be omitted. Sucker rods and other equipment are then removed from the well. Accumulated wax and other foreign materials may be scraped from the face of the formation by means of a wire scraper or similar device to improve initial contact of the acid with the formation. Following this, the well bore is filled with crude oil, water, or brine, depending upon the nature of the formation to be treated. The acid solution is then pumped into the well through a string of tubing from a tank truck while fluid is displaced from the well or discharged from the casing head into a measuring tank.

After a volume of fluid equivalent to the volume of tubing in that portion of the well bore to be treated has been displaced, the outlet from the casing head is closed. Pumping of the acid solution into the well is then continued in order to force the solution outwardly into the formation. The acid thus injected dissolves carbonate materials in the formation surrounding the well bore, increasing the permeability and permitting better flow of fluids through the formation. The pumping rate and pressures utilized will obviously depend upon the characteristics of the reservoir and whether fracturing of the formation is desired. After the acid solution has been injected in this manner, the well will normally be shut in and allowed to stand for a period ranging from several hours to a day or more. The pressure on the well is then released and the spent acid solution containing salts formed by reaction of the acids is permitted to flow back into the well bore and is pumped to the surface. The well may thereafter be placed on production or used for other purposes.

In lieu of employing the mixed acids as described above, water-soluble sticks containing acids in solid form may be utilized. Chloroacetic and hydroxyacetic acids, for example, are both solids at normal temperatures and are readily soluble in water. These acids and a suitable corrosion inhibitor can be molded into sticks about 1½ inches in diameter and about two feet long and introduced into water already present in the well. This procedure eliminates the necessity for acid trucks and other equipment and simplifies transportation problems in remote areas. It is particularly advantageous in cases where there is normally a time delay between the completion of a tubingless well and the perforation of the casing. The general procedure in such cases is to introduced an acid into the well at the time of completion and to allow it to stand in the well bore until the perforating step has been carried out. The presence of the acid during this period may result in excessive corrosion, particularly if the formation temperature is high. By employing the acids in stick form and introducing them just prior to the perforating step, this corrosion can be reduced. Because of the simpler procedure, the cost of the acid treating step is lower than if acids in liquid form were employed. Any acid remaining in the well bore after perforating can be neutralized with sodium hydroxide or a similar base introduced in either liquid or solid form.

The nature and objects of the invention are more fully illustrated by the following examples and the attached drawing showing the results of experiments carried out to determine the effectiveness of the mixed acid solutions for acid treating purposes.

EXAMPLE 1

Solutions containing various mixtures of acetic acid, formic acid, chloroacetic acid, hydroxyacetic acid and citric acid were prepared and tested to determine the acid reaction rates on calcium carbonate. The calcium carbonate employed was non-porous marble rock in the form of cylinders of fixed shape and surface area having the dimensions of 1–25 inches in diameter and 0–325 inches in length. The acid solutions used were prepared by diluting concentrated acids procured from commercial suppliers with distilled water until the required concentrations were obtained. The pH values for the acid solutions are set forth in the following table:

*Table 1*

| Acid: | pH |
|---|---|
| 10% hydroxyacetic | 1.7 |
| 25% chloroacetic | 1.1 |
| 25% chloroacetic +5% citric | 1.1 |
| 10% acetic | 2.4 |
| 25% chloroacetic +10% hydroxyacetic | 0.9 |
| 25% chloroacetic +10% acetic | 0.95 |
| 25% formic | 1.35 |
| 35% formic | 0.9 |
| 25% formic +10% acetic | 1.2 |
| 35% acetic | 1.85 |

Each test was carried out by contacting a single marble cylinder with a fixed volume of each acid solution under the conditions of 150° F. and 300 p.s.i.g. pressure. The pressure was applied by means of compressed nitrogen gas. Samples of the acid were taken at the start of each test and at various times during the test. These samples were titrated with sodium hydroxide to determine the fraction of the acid reacted. The calculated values for the unreacted acid were plotted against time to obtain the curves shown in FIGURE 1 of the drawing.

It can be seen from FIGURE 1 that the reaction rates of the various solutions differed considerably. The slowest rate was obtained with the 35% solution of acetic acid. Calculations show that the quantity of calcium acetate formed when such a solution is completely reacted with calcium carbonate is considerably in excess of the solubility limit of calcium acetate in the spent solution and that precipitation may take place unless additional water is present. The acetic acid should therefore generally be employed in concentrations below 35%. The calculated solubility limit of calcium formate is less than that for calcium acetate and hence formic acid should also be used in concentrations under 35%. As the acid concentration is decreased, the reaction rate increases. This can be seen by comparing the curves for 35% acetic acid and 10% acetic acid. At the end of six hours, about 86% of the 35% acid and only about 42% of the 10% acid remained unreacted. The 35% formic acid and the 25% formic acid curves show a similar inverse relationship between concentration and reaction rate. About 78% of the 35% solution and about 62% of the 25% solution were unreacted after six hours. This increase in the reaction rate with decreasing acid concentrations precludes the effective use of dilute solutions of a single organic acid to avoid difficulties which may be encountered due to low salt solubilities.

A further disadvantage in using a solution of a single acid is that the amount of calcium carbonate or similar rock that can be dissolved per volume of acid decreases as the acid concentration is reduced. About 0.4 gallon of 35% acetic acid will theoretically be required to dissolve one pound of calcite; while about 1.4 gallons of solution will be necessary if a 10% acetic acid is used. Any reduction in concentration to avoid solubility problem thus involves a sacrifice in the amount of rock that can be dissolved per volume of acid.

The advantages of the mixed acids of the invention are illustrated by the curve for a mixture of 25% formic acid and 10% acetic acid. This mixture was prepared by mixing formic and acetic acids and then diluting the mixture until the concentrations of the two were 25% and 10% by weight, each based on the weight of the individual acid and the total water present. It will be noted that the reaction rate of the mixture was similar to that obtained with the 35% formic acid solution, even though considerably less formic acid was present. It is thus apparent that relatively low reaction rates can be obtained with acid mixtures and that each individual acid constituent in such a mixture can be used in a lower concentration than would be required to obtain the same reaction rate with a single acid.

A comparison of the curve obtained with the mixture of 25% formic acid and 10% acetic acid with those obtained with individual solutions of 25% formic acid and 10% acetic acid indicates that each constituent in the mixture must affect the reaction rate of the other constituent. The mixture and the 25% formic acid solution both contained the same amount of formic acid. Similarly, the mixture and the 10% acetic acid solution both contained the same amount of acetic acid. If the two constituents in the mixture acted independently of one another, the curve obtained with the mixture should lie somewhere between the two individual curves. It can be seen that such was not the case. The curve representing the mixed acids was much higher than either curve obtained with the individual acids, indicating a lower reaction rate for the mixture. Similar results were obtained with other mixtures. Solutions containing chloroacetic and acetic acids, chloroacetic and citric acids, and chloroacetic and hydroxyacetic acids all gave lower reaction rates than were obtained with solutions of the individual acids.

The reasons for the behavior of the mixed acids are not fully understood. There are indications, however, that low molecular weight carboxylic acids combine in aqueous solution to form hydrogen bonded complex molecules having properties different from those of the free acids. These complex molecules are apparently in equilibrium with the free acid molecules and gradually break down as the free acids are consumed. This may be responsible for the apparent interaction between the acid constituents of the mixtures and may explain the results obtained. Other mechanisms may also be involved.

It will be apparent from the foregoing that the use of a mixture of two or more organic acids in place of a single acid reduces salt solubility problems and permits lower reaction rates than may otherwise be feasible.

EXAMPLE 2

The application of the mixed acids is further demonstrated by the results of field tests carried out in a well completed in a tight limestone formation. The productivity of the test well over a three year period is shown in FIGURE 2 of the drawing. The field in which the test well was located contained six wells that had been heavily acidized with 15% hydrochloric acid upon completion. This initial acid treatment had little effect. Five of these wells were later subjected to a second acid treatment with 15% hydrochloric acid and again there was no significant change in productivity. The test well employed was located in the vicinity of these six wells but was initially completed with 70 feet of open hole without acid wash or injection. This well initially produced 87 barrels of oil per day. Six months after completion, the productivity had declined to 55 barrels of oil per day. A pump was then installed in the well to increase the production rate. About a year later the well was subjected to an acid abrasijet treatment with hydrochloric acid. The quantity of acid employed was greater than that used during a normal acidizing operation. Despite this, the treatment produced little or no increase in productivity. Shortly thereafter, the well was subjected to a large volume crude oil squeeze in an effort to improve productivity. This produced little improvement. By this time productivity of the well had declined to an average of 10 barrels of oil per day. A treatment with the mixed organic acids of the invention was then employed. The treating solution consisted of 35 barrels of a mixture of 25% formic acid and 10% acetic acid containing two gallons of sodium mercaptobenzothiozole as a corrosion inhibitor and 10 gallons of a commercial demulsifier. This solution was squeezed into the formation with an initial injection pressure of 500 pounds per square inch and a final pressure of 3,000 pounds per square inch at a rate of ½ barrel per minute. The acid solution was allowed to stand in the formation overnight and was then backflowed. A capacity test of the well following this treatment showed that it was capable of producing 85 barrels of clean oil per day. The well was placed on production at the rate of 65 barrels of oil per day. At the end of six months the well was still producing at the 65 barrels of oil per day rate and the productivity remained unchanged. The cumulative increase in production during this six months period amounted to approximately 9,000 barrels of oil.

It can be seen from the foregoing that the treatment with the mixed acids of the invention was highly successful, even though the treatment of other wells in the field with conventional hydrochloric acid and an abrasijet treatment of this same well with hydrochloric acid produced little improvement. It can be seen from FIGURE 2 that the treatment with the mixed acids of the invention was highly successful and resulted in a substantial, sustained increase in productivity.

EXAMPLE 3

A further test was carried out in a well which had been perforated and acidized with 500 barrels of 15% hydrochloric acid at 1600 pounds per square inch three years earlier. The initial production of the well was 60 barrels of clean oil per day. During the three year period following the initial completion and acidizing of the well the production had declined to 33 barrels of oil per day. This well was treated with 1000 gallons of a solution of 25% formic acid and 10% acetic acid containing five gallons of a commercial demulsifier and 15 gallons of a commercial arsenic-based corrosion inhibitor. The mixed acid solution was squeezed into the formation with an average pressure of 950 lbs. per square inch at a rate of two-thirds of a barrel per minute. The productivity of the well increased as a result of the acid treatment to about 55 barrels of oil per day. After six months the well was still producing at the 55 barrels per day rate and showed no signs of decreasing in productivity.

What is claimed is:

1. A method for increasing the permeability of a subterranean formation in the vicinity of a borehole penetrating said formation which comprises injecting an aqueous solution containing as the essential acidic constituent thereof a mixture of at least two aliphatic carboxylic acids having from one to six carbon atoms per molecule into the formation surrounding said borehole, said carboxylic acids being present in said solution in a total acid concentration between about 10% and about 50% by weight, and thereafter maintaining said solution in contact with said formation under pressure for a period sufficient to increase the permeability of said formation.

2. A method as defined by claim 1 wherein said carboxylic acids are formic acid and acetic acid.

3. A method as defined by claim 1 wherein said carboxylic acids are chloroacetic acid and hydroxyacetic acid.

4. A method as defined by claim 1 wherein said carboxylic acids are chloroacetic acid and citric acid.

5. A method for increasing the permeability of a subterranean carbonate formation in the vicinity of a borehole penetrating said formation which comprises injecting an aqueous solution containing as the essential acidic constitutent thereof a mixture of formic acid and a second low molecular weight carboxylic acid containing up to about six carbon atoms per molecule into the formation surrounding said borehole, said acids being present in said solution in a total acid concentration between about 10% and about 50% by weight, and thereafter maintaining said solution in contact with said formation under pressure for a period sufficient to increase the permeability of said formation.

6. A method as defined by claim 5 wherein said formic acid is present in said solution in a concentration between about 5% and about 35% by weight and said second carboxylic acid is present in said solution in a concentration between about 1% and about 20% by weight.

7. A method as defined by claim 6 wherein said second acid is acetic acid.

8. A method as defined by claim 6 wherein said second acid is propionic acid.

9. A method of increasing the permeability of a carbonate formation in the vicinity of the well penetrating said formation which comprises injecting an aqueous solution containing from about 5% to about 35% by weight of a first aliphatic carboxylic acid containing from about one to about six carbon atoms per molecule and from about 1% to about 20% by weight of a second aliphatic carboxylic acid containing from about one to about six carbon atoms per molecule into said formation, maintaining said solution in contact with said formation under pressure for a period sufficient to increase the formation permeability, and thereafter reducing the pressure to permit backflow of the spent solution into said well.

10. A method as defined by claim 9 wherein said solution contains from about 20 to about 30 weight percent of formic acid and from about five to about 15 weight percent of acetic acid.

11. A method as defined by claim 9 wherein said solution contains from about 20 to about 30 weight percent of chloroacetic acid and from about five to about 15 weight percent of hydroxyacetic acid.

12. A well treating process which comprises injecting an aqueous solution consisting essentially of from about 20 to about 30 weight percent of formic acid, from about five to about 15 weight percent of acetic acid, from about 0.01 to about three percent of a surface active agent, and from about 0.05 to about 3.5 weight percent of a corrosion inhibitor into a well penetrating a subterranean reservoir, applying sufficient pressure to force said solution into said reservoir, maintaining said reservoir under pressure for a period sufficient to increase the formation permeability, and thereafter backflowing spent solution from said reservoir into said well.

13. A process as defined by claim 12 wherein suffiicient pressure to fracture said reservoir is applied to said solution.

14. A process as defined by claim 12 wherein said aqueous solution includes a thickening agent.

References Cited by the Examiner

UNITED STATES PATENTS

| | | | |
|---|---|---|---|
| 1,877,504 | 9/1922 | Grebe et al. | 166—1 |
| 2,045,899 | 6/1936 | Davis | 166—42 |
| 2,175,095 | 7/1937 | Stoesser | 166—42 |
| 2,301,875 | 11/1942 | Holmes | 252—8.55 |
| 2,400,395 | 5/1946 | DeGroote et al. | 252—8.55 |
| 2,824,833 | 2/1958 | Cardwell et al. | 252—8.55 |
| 3,122,204 | 2/1964 | Oakes | 166—42 |
| 3,142,335 | 7/1964 | Dill et al. | 252—8.55 |

OTHER REFERENCES

The Condensed Chemical Dictionary, 6th edition, 1961, Reinhold Publishing Corp., New York, N.Y., page 543 relied upon.

CHARLES E. O'CONNELL, *Primary Examiner.*

S. J. NOVOSAD, *Assistant Examiner.*